United States Patent [19]

Tashiro

[11] Patent Number: 5,098,273
[45] Date of Patent: Mar. 24, 1992

[54] APPARATUS FOR CUTTING AND SHAPING A SPHERICAL BODY

[75] Inventor: Yasunori Tashiro, Utsunomiya, Japan

[73] Assignee: Rheon Automatic Machinery Co., Ltd., Utsunomiya, Japan

[21] Appl. No.: 635,054

[22] Filed: Dec. 28, 1990

[30] Foreign Application Priority Data

Mar. 30, 1990 [JP] Japan .................. 2-85833

[51] Int. Cl.⁵ .............................................. B29C 47/06
[52] U.S. Cl. .................................. 425/132; 264/167; 425/142; 425/308
[58] Field of Search ............... 425/382 N, 287, 142, 425/132, 308; 264/167; 426/512, 516; 72/254, 255, 468

[56] References Cited

U.S. PATENT DOCUMENTS

| | | | |
|---|---|---|---|
| 1,922,770 | 8/1933 | Kornbath | 72/468 |
| 2,044,961 | 6/1936 | Waner | 264/167 |
| 2,260,479 | 10/1941 | Picking | 72/468 |
| 2,578,229 | 12/1951 | Clement et al. | 72/468 |
| 2,664,996 | 1/1954 | Andrews | 72/468 |
| 3,509,785 | 5/1970 | Fuchs, Jr. | 72/468 |
| 3,628,449 | 12/1971 | Phillips, Jr. | 72/468 |
| 3,901,641 | 8/1975 | Onder | 425/406 |
| 4,036,571 | 7/1977 | Geyer et al. | 425/562 |
| 4,251,201 | 2/1981 | Krysiak | 425/311 |
| 4,734,024 | 3/1988 | Tashiro | 425/132 |
| 4,767,304 | 8/1988 | Tashiro | 425/308 |
| 4,767,305 | 8/1988 | Tashiro | 425/308 |

Primary Examiner—Jay H. Woo
Assistant Examiner—W. J. Matney, Jr.
Attorney, Agent, or Firm—Guy W. Shoup; David W. Heid

[57] ABSTRACT

An improved apparatus for cutting and shaping a spherical material, which is composed of an assembly consisting of a number of rotary polygonal members for forming an opening at their center to cut and shape the material passing through the opening. Each of the members with curved side surfaces that are opposite each other is associated with each other such that when the members make a pivotal movement, the curved surface of each member slides over the curved surface of an adjacent member, and each of the members has a uniform thickness except for the area near the tip, where the thickness nonequiangularly decreases toward the tip so that substantially spherical products completely covered by an outer cover of a uniform thickness can be produced.

6 Claims, 8 Drawing Sheets

APPARATUS FOR CUTTING AND SHAPING A SPHERICAL BODY

TECHNICAL FIELD

The present invention is concerned in general with an apparatus for cutting and shaping a spherical body. It is particularly useful for shaping a substantially round food product consisting of dough and filling material without generating the problems of material adhesion and a rough or uneven dough thickness as well as of the problem of a filling protruding from the dough.

BACKGROUND OF THE INVENTION

Various methods have been disclosed of cutting and shaping an enveloped bun-like body by using a continuously fed two-layer material such as is disclosed in U.S. Pat. No. 4,734,024. For instance, it discloses an apparatus for shaping a round body consisting of a dough coating and a filling, which comprises an assembly comprising a plurality of circumferentially disposed members combined to shape a spheroidal body. Each of the members has at least two sliding surfaces, and they are so combined that a sliding surface of one member is slidable on a sliding surface of another member, that by sliding the members an opening is formed or closed in the center of the assembly, and that the opening is confined by walls consisting of the inwardly exposed part of the sliding surfaces of the members and is of a cross-sectional area, when the opening is fully open, sufficient to pass a descending cylindrical body.

While shaping a spheroidal body by the assembly of slidable members is effective, particularly in precluding a member from intruding into the body, and thereby breaking the outer layer of the cylindrical body, it has certain disadvantages. Because of the structural conditions of the assembly, the number of the slidable members is limited up to about six, so that only polygonally-shaped products have been obtained. However, their external appearance falls far below that of those hand-shaped spherical products. Although cutting and shaping spherical products is possible without exposing their fillings, due to mechanical and dimensional imperfections in both the slidable members and in their assembly, a rough and uneven outer cover is formed when a bar-shaped dough is cut. If a product with an even and smooth outer cover is to be produced, the product must be finished through additional manual work, or the like. Further there was also some difficulty in preventing materials from adhering to the member, in completely precluding fillings from being exposed, or in providing an outer cover of a uniform thickness.

Accordingly, it is an object of the subject invention to provide an improved apparatus for cutting and shaping a substantially spherical product.

It is another object of the subject invention to provide an improved apparatus for cutting and shaping a spherical product using a new shutter or iris assembly mechanism comprising a number of rotatable polygonal members.

It is a further object of the subject invention to provide an improved apparatus for cutting and shaping a spherical product which precludes materials from adhering to the members, due to new and specially designed polygonal members.

It is still another object of the subject invention to provide an improved apparatus for cutting and shaping a spherical product which has a uniform and smooth outer cover by using new and specially designed driving mechanisms and polygonal members.

SUMMARY OF THE INVENTION

In accordance with the above objects and other objects, this invention provides an improved apparatus for cutting and shaping a spherical material, comprising an assembly consisting of a plurality of identically-shaped polygonal members 10, pivotally fitted to fulcrums B that are equidistantly disposed on a circle a so that each member forms an opening 16 at the center A of the circle when each member turns away from the center A of the circle a and closes the opening 16 when each member turns toward the center A of the circle a, to thereby cut and shape the material passing through the opening 16.

Each of the members 10 has first and second curved side surfaces $y_1$ and $y_2$ that are opposite each other, and abut each other at the tip 18 positioned opposite the fulcrum B. The first and the second curved side surfaces $y_1$ and $y_2$ are defined so that each of them is an arc of a circle with a radius equal to the distance $a'$ between adjacent fulcrums $B_1$ and $B_2$, and when the tip 18 of each member is at the center A of the circle a, the center $x_1$ of the arc of the first curved side surface $y_1$ is at the same time located at a distance from the fulcrum $B_1$ of the member that is equal to the radius R of the circle and at a distance $a'$, and the center $x_2$ of the arc of the second curved side surface $y_2$ is at the same time located at a distance from the fulcrum $B_2$ of the member next in the direction going from $y_1$ to $y_2$ that is equal to the radius R of the circle and at a distance from the center A of the circle a that is equal to the distance $a'$. Each of the members is associated with each other such that when the members make a pivotal movement, the part near the tip of the second curved side surface $y_2$ of each member slides over the first curved side surface $y_1$ of an adjacent member, and has a uniform thickness except for the area near the tip 18 thereof, where the thickness nonequiangularly decreases toward the tip 18.

In a preferred embodiment, each of the members used in the apparatus of this invention has a uniform thickness, except for the area near the tip 18 thereof, where the thickness decreases towards it.

In other preferred embodiments, the ridgelines at the tip area of the polygonal members used in the apparatus of this invention are beveled or have arcuate cross sections.

DETAILED DESCRIPTION OF THE INVENTION

Figure 1:
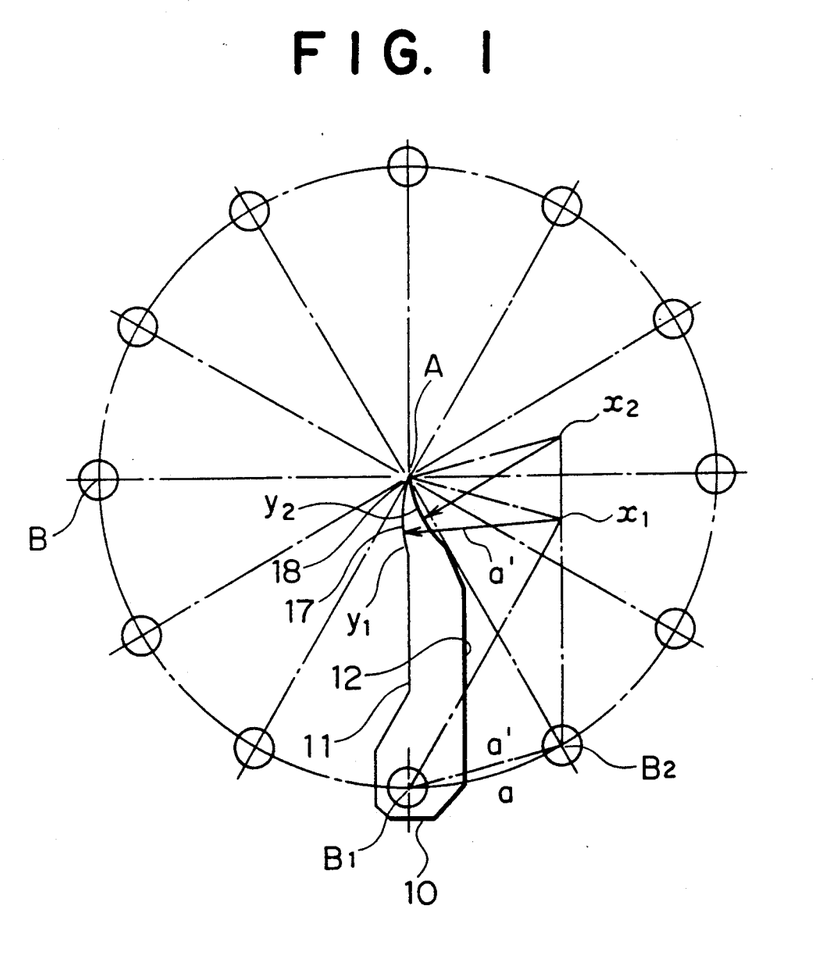
FIG. 1 is a simplified view of a polygonal member for forming an opening to cut a material passing through it.

Referring to FIG. 1, the feature of polygonal members 10 constituting the shutter mechanism of this invention is shown.

Fulcrums B are equidistantly disposed on a circle a with a radius R around the center A. At each fulcrum is positioned a shaft to which the polygonal member is pivotally fitted.

The distance between two adjacent fulcrums $B_1$ and $B_2$ is represented by $a'$.

A curve $y_1$ is an arc of a circle whose radius is equal to the distance $a'$ and whose center $x_1$ is at the same time located at a distance from the fulcrum $B_1$ that is equal to the radius R and at a distance from the center A that is equal to the distance $a'$.

A side surface defined by the curve $y_1$ constitutes the blade 17 of the polygonal member. The blade contacts and cuts material.

A curve $y_2$ is an arc of a circle whose radius is equal to the distance $a'$ and whose center $x_2$ is at the same time located at a distance from the fulcrum $B_2$ that is equal to the radius R and at a distance from the center A that is equal to the distance $a'$.

A side surface defined by the curve $y_2$ is positioned in the rear of the curve $y_1$, and limits the width of the blade 17 at the tip of the blade.

Figure 2:
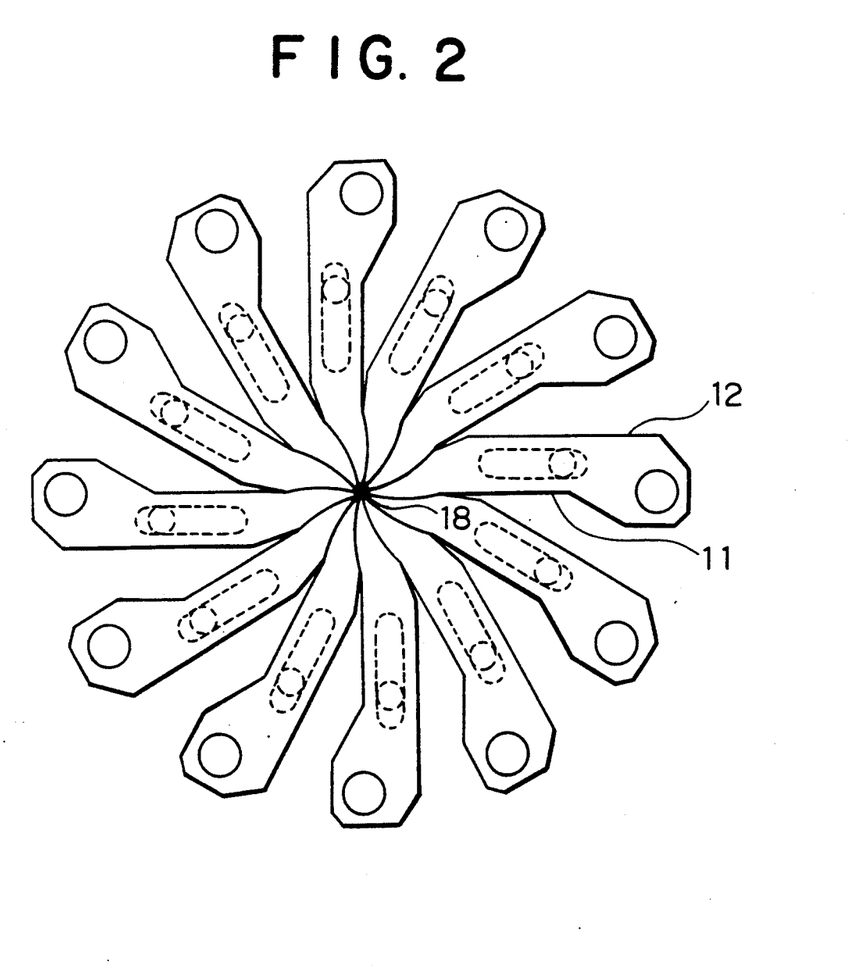
FIG. 2 is a schematic plan view of the collectively assembled polygonal members when the opening is closed.
Figure 3:
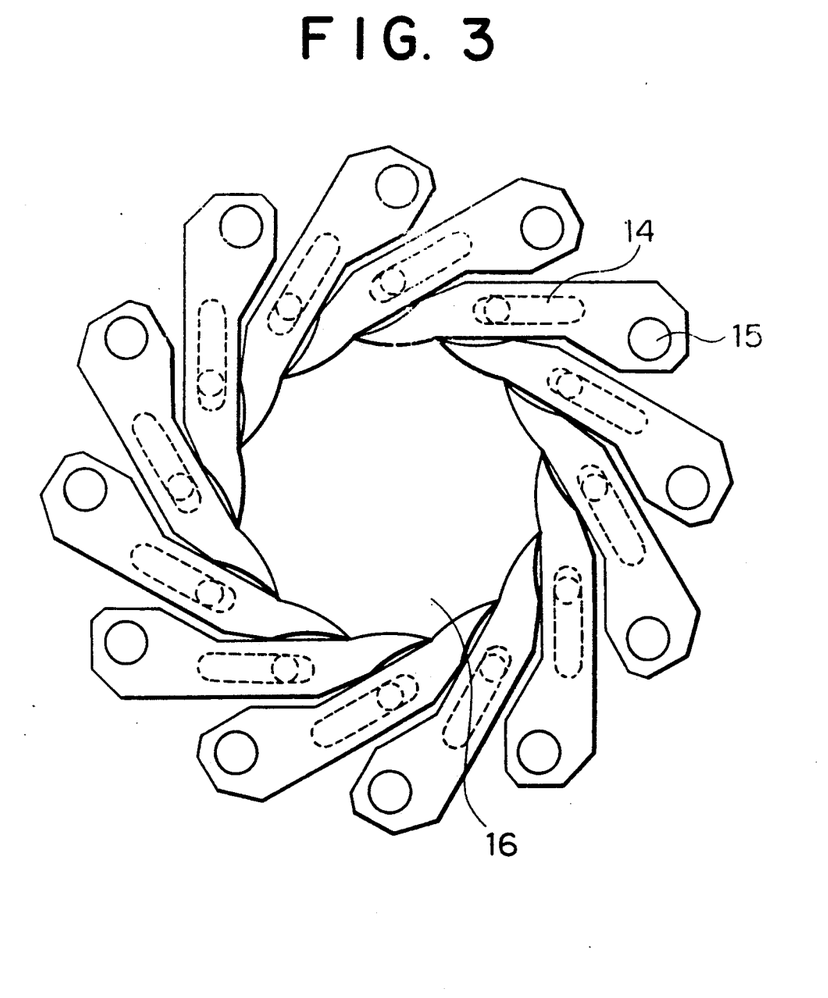
FIG. 3 is a schematic plan view of the assembled polygonal members when the opening is formed.
Figure 4:
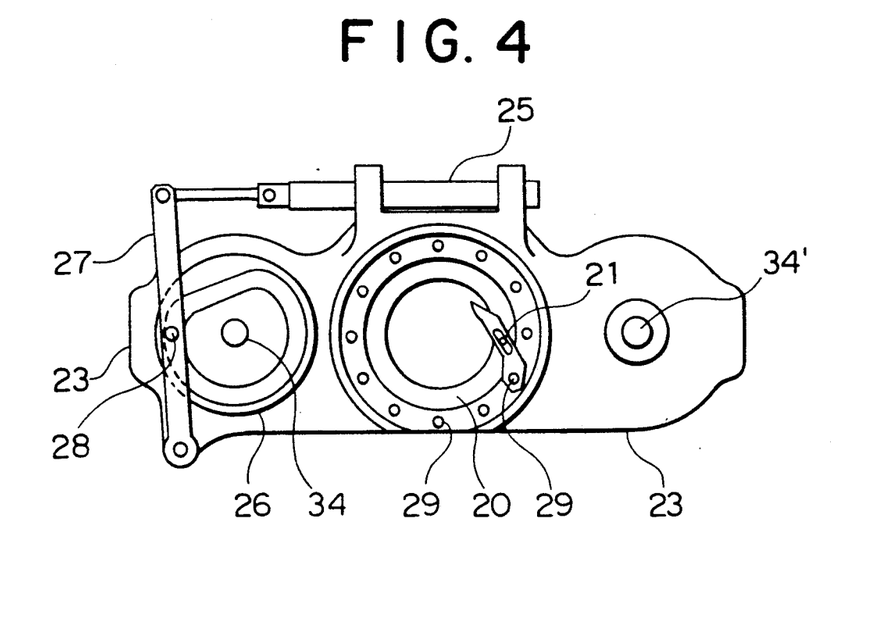
FIG. 4 is a top view of a base.
Figure 5:
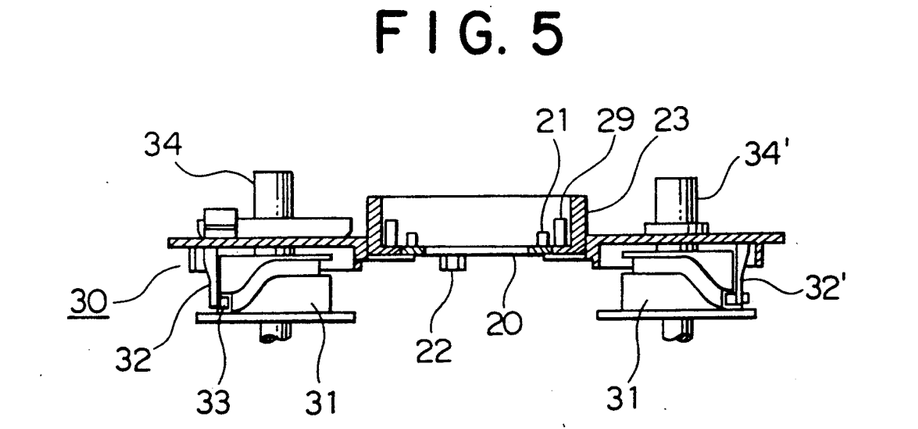
FIG. 5 is a front view of a cross section of the base.
Figure 6:
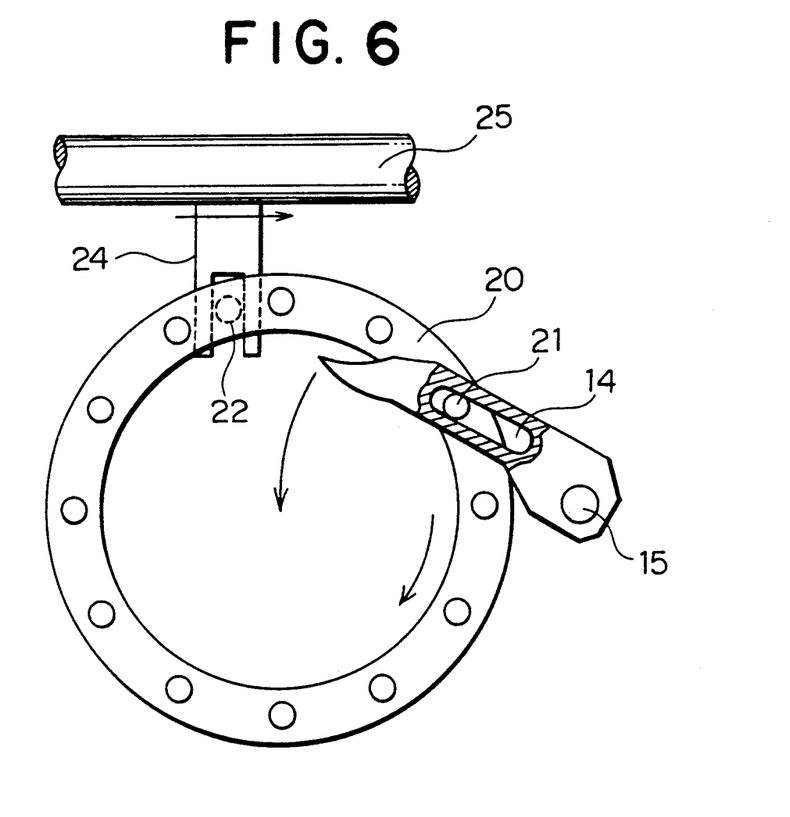
FIG. 6 is a top view showing a transmission mechanism for driving the polygonal members.
Figure 7:
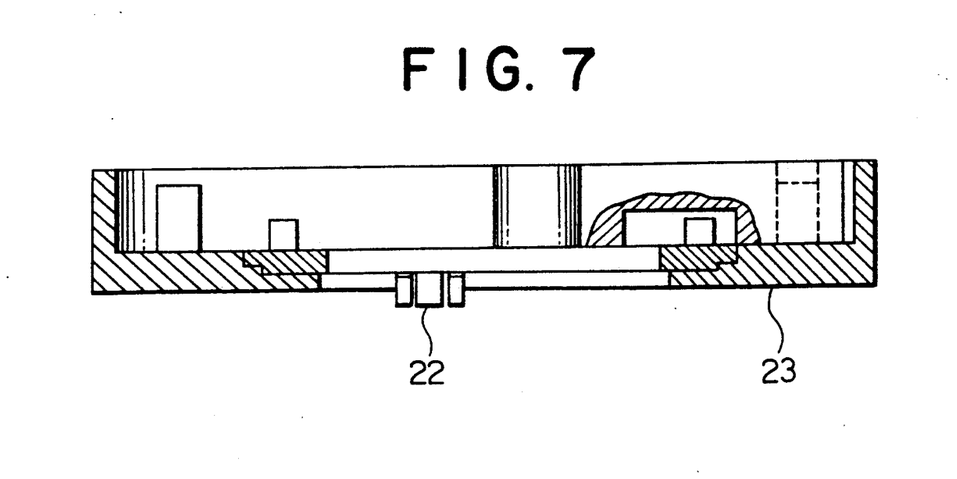
FIG. 7 is an enlarged view showing a partial cross section of the base.

Side surfaces 11 and 12 constituting the neck of the polygonal member are formed such that there is no interference among any adjacent polygonal members during the course of the rotation of each polygonal member from and to the positions shown in FIGS. 2 and 3. A hole 15, into which the fulcrum B is fitted, is located at the end of the neck. An elongated hole 14 is provided in the middle of the member.

Referring to FIGS. 4-7, the method of driving the polygonal members 10 will now be explained. They are fitted, through the holes provided therein, into supporting shafts 29 on a base 23. Actuating pins 21 are loosely fitted into elongated holes 14 of the members.

These actuating pins 21 are mounted on an annular rotating plate 20 that fits in the base 23 and slidably rotates on the base.

The rotating plate 20 is driven through a driving pin 22 that is mounted to the bottom thereof, and guided by a guide bar 24 fixed to a rod 25.

One end of the rod 25 is pivoted on one end of an arm 27, the other end of which is pivotally fitted to the base 23.

A cam follower 28 mounted in the middle of the arm 27 engages a groove on a cam 26 that is mounted to, and rotates on, the base. The cam 26 is driven by a driving shaft 34 that extends through the left side of the base. Therefore, when the driving shaft 34 rotates the cam 26 moves the cam follower 28 to move the arm 27 and the connected rod 25. The rod 25 causes the guide bar 24 to move so as to actuate the driving pin 22, so that the rotating plate 20 rotates to rotate the polygonal members 10.

The base is arranged so that it can move up and down. The driving shaft 34 and its counterpart, a driving shaft 34', symmetrically provided on the right side of the base, are equipped with other cams 31 and 31'. A cam follower 33, mounted on an arm 32 extending from the base 23, is fitted into grooves circumferentially provided on the cams 31 and 31'.

When the cams 31 and 31' rotate, the base goes up and down through the cam follower 33 guided by the cams.

As above explained, the opening provided by the polygonal members is opened and closed through the rotation of the cam 26. This opening and closing movement is synchronized with the up and down movement of the base.

Owing to the structure of such rotary polygonal members, which do not interfere with each other during their rotation, the restriction on the number of shafts 29 that can be mounted on a frame is reduced, so that, by mounting a large number of polygonal members on the frame, forming a product that is almost a sphere has been achieved.

Although the embodiment of this invention shows only twelve polygonal members in an assembly, it is obvious that an assembly equipped with more polygonal members will be more effective.

The cutting functions and effects of the apparatus of this invention will now be described by referring to FIGS. 8-15.

Figure 8:
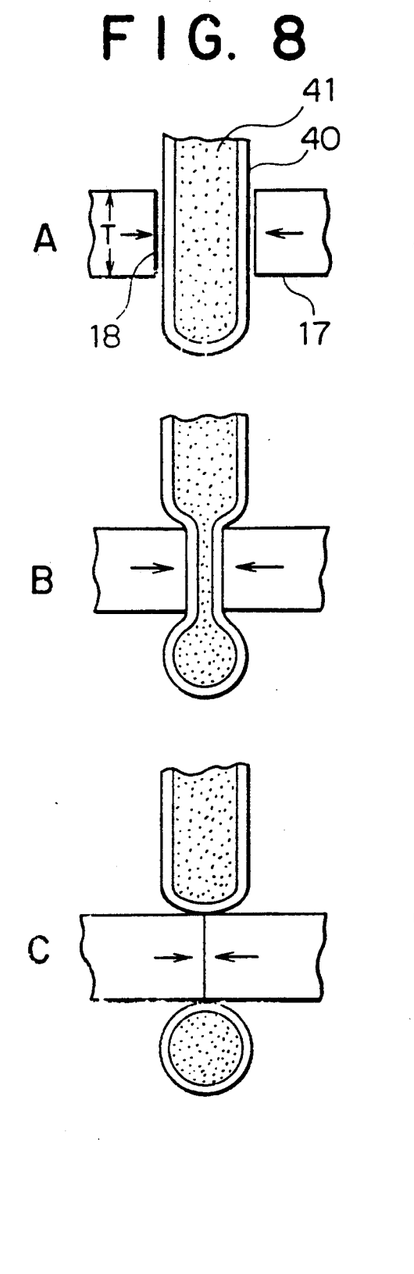
FIGS. 8, 9, and 10 are schematic cross sections of the material and polygonal members showing stepwise the process and effects of cutting a spherical body.
Figure 9:
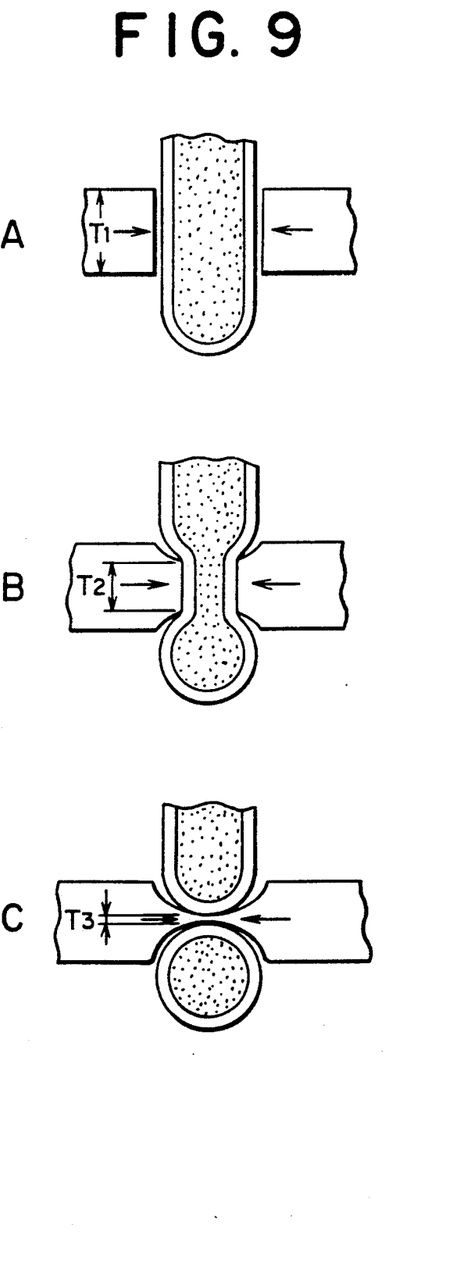
Figure 10:
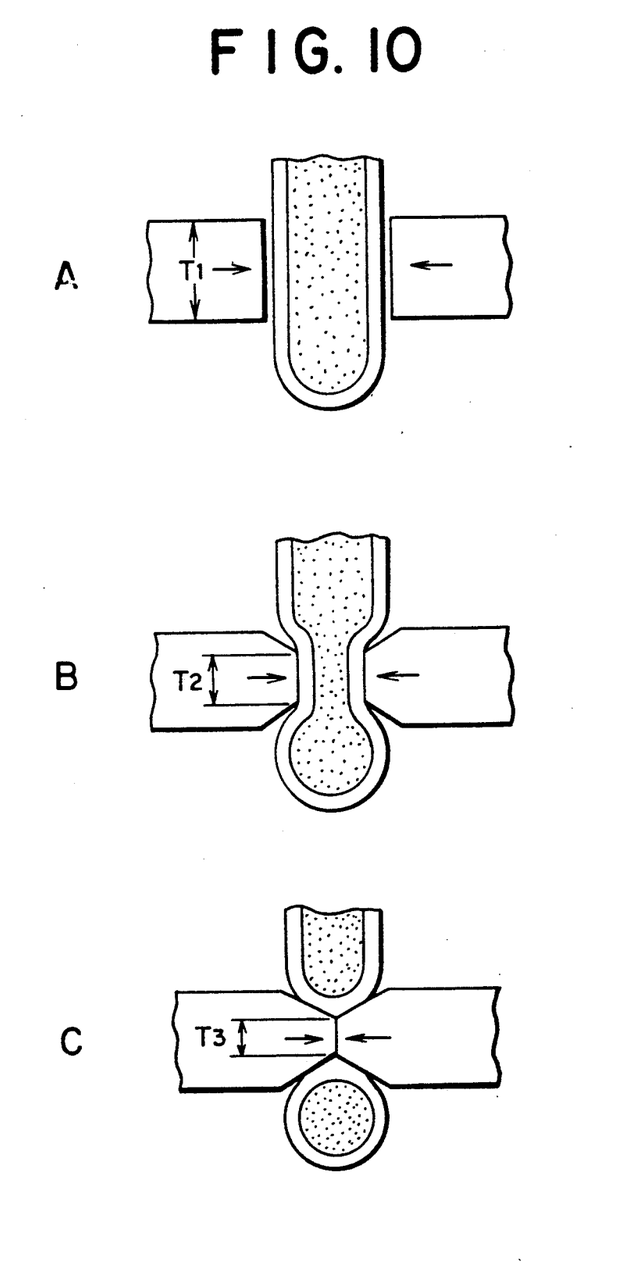

FIGS. 8, 9, and 10 show cross sections of a continuous bar of a two-layer material consisting of a coating 40 consisting of dough with a filling 41. The continuous bar is in contact with the blades 17 of the polygonal members, and finally cut off by their tips 18. The thickness T of the tip 18 of the blades differs, depending on the characteristic of the material to be cut. FIG. 8 shows the blade 17 with a constant thickness T, FIG. 9 shows the blade 17 with the thickness nonequiangularly decreasing toward the tip 18, and FIG. 10 shows the blade 17 with the thickness equiangularly decreasing toward the tip 18 that has a prescribed thickness $T_3$.

In FIGS. 8A, 8B, and 8C, the blades contact the coating 40 over a wide area, and move the coating 40 to the center, with the thickness T of the blades kept constant. When the blades all abut each other at the center of the assembly, the moved dough is pressed aside into the upper and lower parts of the bar while completely enveloping the filling 41 at the time of separation. This shape of the polygonal member is suitable for cutting and shaping a hard and highly elastic material.

In FIG. 9, the thickness of the blades 17 nonequiangularly decreases toward the tip 18. While the reduction rate in the contact area is set to be large at the early stage of the cutting process, at the later stage it is set to be small, as shown in FIGS. 9B and 9C. Namely, the quantity of the moving dough is large when the contact area between the material and the blades is large, and the quantity is small when the contact area is small, so as to provide a uniform thickness of the outer cover to be formed. This shape of the polygonal member is particularly effective for materials with thin, soft envelopes such as food products having a thin dough shell surrounding a filling material.

In other words, if a material to be cut has a thin, soft envelope, the spread of the envelope becomes insufficient at the later stage of the cutting process so that there is a possibility of exposing fillings. To avoid this, at the later stage of the process, the envelope, which has been moved to the central part in a comparatively large quantity, slowly spreads, with the contact area gradually decreasing so as to stabilize the spread of the envelope.

Figure 11:
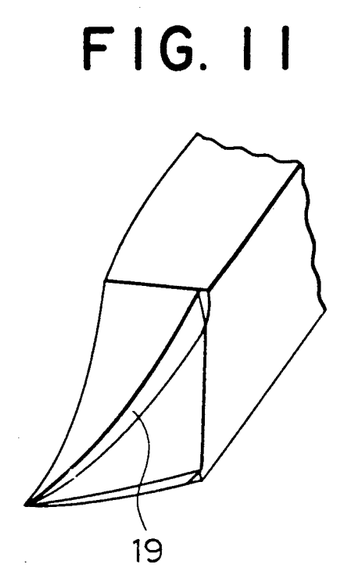
FIG. 11 is a perspective view of the beveled ridgelines at the tip of polygonal members.
Figure 12:
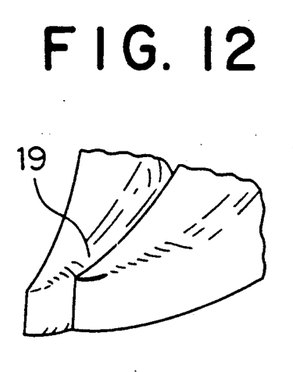
FIG. 12 is a perspective view of the rounded ridgelines at the tip of a polygonal member.

In FIG. 10, the blade thickness of the polygonal member constantly decreases toward the tip 18, which has a prescribed thickness. This shape of the polygonal member fits soft, comparatively highly elastic materials. FIGS. 11 and 12 show the blades of other embodiments of this invention. The ridgelines 19 of the blade are beveled or provided with round cross sections so that products with smooth, even outer covers result. This is because rough outer covers that are caused by ridgelines with an acute angle have been eliminated in these embodiments.

Figure 13:
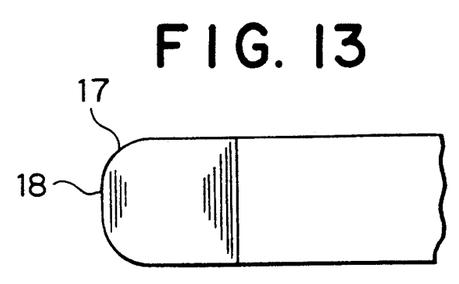
FIG. 13 is a partial cross section of the tip of a polygonal member with a round convex blade.

If the blade has a round convex curve as shown in FIG. 13, it has effects similar to those blades shown in FIGS. 8 and 10 on materials which require a large quantity of moving envelopes throughout the cutting process.

Figure 14:
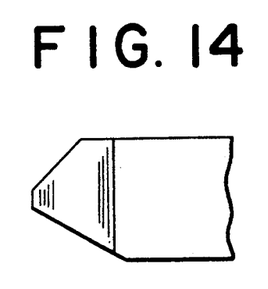
FIG. 14 and 15 are partial cross sections of the polygonal members with blades formed so that their upper and lower part have thicknesses that are differently reduced.
Figure 15:
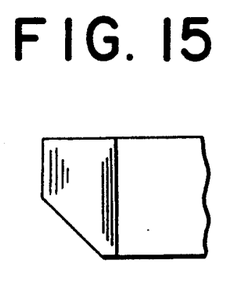

FIGS. 14 and 15 show the blades of other embodiments, each side of which has a different reduction rate in the thickness toward the tip. When their upper and lower surfaces have a different angular reduction rate in the contact area, the thickness of the outer covers of the products can be adjusted, if necessary, at the upper, side, or lower part of the products.

As above explained, by providing various shapes of polygonal members according to the characteristics of continuous bars comprising a plurality of concentric layers of materials, the apparatus of this invention can produce a substantially spherical product completely covered by an outer cover of a uniform thickness.

The invention provides an improved apparatus for cutting and shaping very sticky cake-like materials to obtain neatly-shaped products free from any impediments caused by material adhesion, without the use of any special parting agents or manual powdering.

I claim:

1. An apparatus for cutting and shaping a spherical material, comprising
    an assembly consisting of a plurality of identically-shaped polygonal members, one end of each of the members being pivotally fitted to each of a plurality of fulcrums that are equidistantly disposed on an imaginary circumference formed by connecting the fulcrums, so that the members collectively and radially form and close an opening concentric to the circumference, thereby cutting and shaping the material passing through the opening,
    each of the members having first and second curved side surfaces that are opposite to each other, and abut each other at a tip positioned opposite to the fulcrum, the first and the second curved side surfaces being so defined that each of them is an arc of a circle with a radius equal to the distance between the fulcrum of adjacent members and when the tip of each member is at a center of the opening, the center of the arc of the first curved side surface is at the same time located at a distance from the fulcrum of the member that is equal to the radius of the circumference on which the fulcrums are located and at a distance from the center of the opening that is equal to the distance between the adjacent fulcrums, and the center of the arc of the second curved side surface is at the same time located at a distance from the fulcrum of the member next in the direction going from the first curved side surface to the second curved side surface that is equal to the radius of the circumference on which the fulcrums are located and at a distance from the center of the opening that is equal to the distance between the adjacent fulcrums, the members being associated with each other such that when the members make a pivotal movement, the part near the tip of the second curved side surface of each member slides against the first curved side surface of an adjacent member, and having a uniform thickness except for the area near the tip thereof, where the thickness nonequiangularly decreases toward the tip.

2. An apparatus for cutting and shaping a spherical material, comprising an assembly consisting of a plurality of identically-shaped polygonal members, one end of each of the members being pivotally fitted to each of a plurality of fulcrums that are equidistantly disposed on an imaginary circumference formed by connecting the fulcrums so that the members collectively form and close an opening concentric to the circumference, thereby cutting and shaping the material passing through the opening, each of the members having first and second curved side surfaces that are opposite to each other, and abut each other at a tip positioned opposite to the fulcrum, the first and the second curved side surfaces being so defined that each of them is an arc of a circle with a radius equal to the distance between the fulcrums of adjacent members, and when the tip of each member is at a center of the opening, the center of the arc of the first curved side surface is at the same time located at a distance from the fulcrum of the member that is equal to the radius of the circumference on which the fulcrums are located and at a distance from the center of the opening that is equal to the distance between the adjacent fulcrums, and the center of the arc of the second curved side surface is at the same time located at a distance from the fulcrum of the member next in the direction going from the first curved side surface to the second curved side surface that is equal to the radius of the circle on which the fulcrums are located and at a distance from the center of the opening that is equal to the distance between the adjacent fulcrums, the members being associated with each other such that when the members make a pivotal movement, the part near the tip of the second curved side surface of each member slides against the first curved side surface of an adjacent member, and having a uniform thickness except for the area near the tip thereof, where the thickness decreases towards the tip, which has a flatted point.

3. The apparatus of claim 1, wherein an edge of said first curved side surface at the tip area of the polygonal members is beveled.

4. The apparatus of claim 1, wherein an edge of said first curved side surface at the tip area of the polygonal members has an arcuate cross section.

5. The apparatus of claim 2, wherein an edge of said first curved surface at the tip area of the polygonal members is beveled.

6. The apparatus of claim 2, wherein an edge of said first curved side surface at the tip area of the polygonal members has an arcuate cross section.

* * * * *